(12) United States Patent
Burges et al.

(10) Patent No.: US 7,925,651 B2
(45) Date of Patent: Apr. 12, 2011

(54) RANKING ITEMS BY OPTIMIZING RANKING COST FUNCTION

(75) Inventors: Christopher J. C. Burges, Bellevue, WA (US); Robert L. Rounthwaite, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 388 days.

(21) Appl. No.: 11/652,459

(22) Filed: Jan. 11, 2007

(65) Prior Publication Data

US 2008/0172375 A1 Jul. 17, 2008

(51) Int. Cl.
G06F 7/00 (2006.01)
G06F 17/30 (2006.01)

(52) U.S. Cl. .................. 707/723; 707/728; 707/730

(58) Field of Classification Search .............. 707/7, 722, 707/723, 728, 731, 999.7, 705, 730
See application file for complete search history.

(56) References Cited

U.S. PATENT DOCUMENTS

| | | | |
|---|---|---|---|
| 6,138,115 A * | 10/2000 | Agrawal et al. .................... 707/3 |
| 6,795,820 B2 | 9/2004 | Barnett |
| 6,826,576 B2 | 11/2004 | Lulich et al. |
| 2002/0123987 A1 * | 9/2002 | Cox .................................. 707/3 |
| 2004/0267770 A1 * | 12/2004 | Lee ................................. 707/100 |
| 2007/0033158 A1 * | 2/2007 | Gopalan ............................ 707/1 |
| 2007/0179966 A1 * | 8/2007 | Li et al. ........................... 707/102 |
| 2007/0192306 A1 * | 8/2007 | Papakonstantinou et al. .... 707/5 |
| 2007/0239702 A1 * | 10/2007 | Vassilvitskii et al. ............. 707/5 |
| 2007/0255689 A1 * | 11/2007 | Sun et al. ........................... 707/3 |
| 2009/0319565 A1 * | 12/2009 | Greenwald et al. ....... 707/103 Y |

OTHER PUBLICATIONS

Liang et al., ".Improve Decision Trees for Probability-Based Ranking by Lazy Learners", IEEE, 2006, pp. 1-9. Download: http://ieeexplore.ieee.org/stamp/stamp.jsp?arnumber=4031927&tag=1.*
Provost et al., "Tree Induction for Probability-Based Ranking", SpringerLink Contemporary, 2004, pp. 1-17. Download: http://www.springerlink.com/content/j25w11432k406231/fulltext.pdf.*
PCT/US2008/050817 PCT Search Report and Written Opinion mailed Jun. 25, 2008.
Robert E. Schapire et al., "Improved Boosting Algorithms Using Confidence-rated Predictions". pp. 1-40 (1998).
Jerome H. Friedman, "Greedy Function Approximation: A Gradient Boosting Machine", Feb. 24, 1999. pp. 1-34.
Liew Mason et al., "Boosting Algorithms as Gradient Decent" pp. 512-518. (2000).
Yoav Freund et al., "An Efficient Boosting Algorithm for Combining Preferences", 2003 pp. 933-969.

* cited by examiner

*Primary Examiner* — Jean B. Fleurantin
*Assistant Examiner* — Hares Jami
(74) *Attorney, Agent, or Firm* — Joseph R. Kelly; Westman, Champlin & Kelly, P.A.

(57) ABSTRACT

A dependency structure is used to divide samples corresponding to items to be ranked into leaf nodes, based on the rank of the items. The dependency structure is trained by splitting or merging training data received at given nodes based on selected features and selected thresholds for those features. A metric is then calculated which is indicative of performance of the node, in splitting the data. The trained structure is then used during runtime to rank items.

12 Claims, 19 Drawing Sheets

RANKING ITEMS BY OPTIMIZING RANKING COST FUNCTION

BACKGROUND

Ranking is widely used in computer systems. Any application that returns a rank ordered set of results to a user is performing some type of ranking operation. Therefore, learning to rank can be a key component for a number of different applications.

For instance, one example of an application where ranking items is useful is information retrieval. Of course, ranking is useful in a wide variety of applications and information retrieval is only one example. In any case, information retrieval search engines often return a set of documents or uniform resource locators (URLs) to a user in response to a query. For the sake of the present discussion, the results will be referred to in terms of URLs. This is not to limit the invention in any way, and the results could just as easily be other items such as documents, audio clips, or any other results desired by a user, whether search results provided in response to an information retrieval query, system, or some other type of query.

In any case, when URLs are retuned in response to a query in an information retrieval context, the URLs are ordered by relevance. In order to train a component to rank URLs by relevance to a query, training data is provided as a set of query/URL pairs and a feature vector describing characteristics of the query, URL, page, and other characteristics such as user behavior. This training data is used to learn a ranking function. The function could output a score, for a given feature, with the ranking performed by sorting by that score; or it could output the rank value directly (for example, a positive integer, with '1' meaning top position); or it could output some other structure encoding the rank.

The training data is, in general, labeled by human beings, where the label indicates the quality of the particular URL, given the query. In one example of a ranking system, there are five labels used and they rate a URL as follows (the rating is indicative of how relevant the URL is to the query):

0=bad, 1=fair, 2=good, 3=excellent, 4=perfect.

Also, in most systems, the utility function typically used to assess the quality of a ranking algorithm are very hard to optimize directly. This is in part due to the fact that the utility function depends on the sorted order of the URLs (for a given query) and not directly on the scores, or labels, for the query.

One example of such a utility function is referred to as normalized discounted cumulative gain (NDCG). The NDCG utility function measures the ranking quality at and above a given rank level. For instance, NDCG at 10 gives a measure appropriate to the top 10 ranked URLs given a query. For a ranking function that outputs a score, which is used to rank the items by sorting, the NDCG function is either flat or discontinuous everywhere. Since most learning algorithms require a smooth utility function, the characteristics of the NDCG utility function present a very difficult problem for common learning algorithms.

The discussion above is merely provided for general background information and is not intended to be used as an aid in determining the scope of the claimed subject matter.

SUMMARY

A dependency structure is used to divide samples corresponding to items to be ranked into leaf nodes, based on the rank of the samples. The dependency structure is trained by splitting training data received at given nodes based on selected features and selected thresholds for those features. A metric is then calculated which is indicative of performance of the node, in splitting the data, using the feature and threshold. The trained structure is then used during runtime to rank items. The rank of an item corresponds to a position of a leaf node the item is assigned to.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
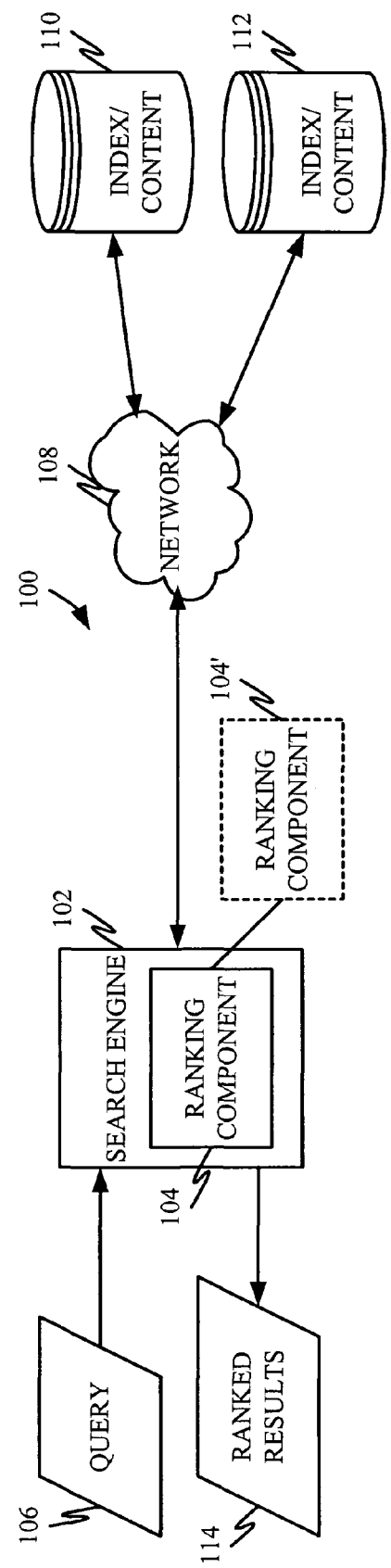
FIG. 1 is a block diagram of a runtime system.

FIG. 1 is a block diagram of an information retrieval system 100. It will be noted, of course, that the present system can be used to rank any desired items provided to a user. It will be described in the context of an information retrieval search in which search results are ranked. However, this is not by way of limitation to the present invention.

In any case, system 100 includes search engine 102 that includes ranking component 104. In another embodiment, ranking component 104 can be external to search engine 102, and simply used to rank the search results provided by search engine 102. This is indicated by 104 in FIG. 1. The present discussion will proceed with respect to the ranking component 104 being within search engine 102. In operation, a user illustratively provides a query 106 to search engine 102. Search engine 102 executes the query, illustratively over network 108, and searches either an index or content in various stores 110 and 112. Of course, in one embodiment, the contents of a wide variety of data stores (such as servers for web sites) is indexed and search engine 102 executes the query 106 against the index. In other embodiments, content can be searched directly. Of course, a wide variety of different networks, such as local area networks, can be used as well.

Search engine 102 retrieves the search results and provides them to ranking component 104. Ranking component 104 ranks the search results according to their relevance to query 106. The ranked search results 114 are then provided back to the user.

Figure 2:
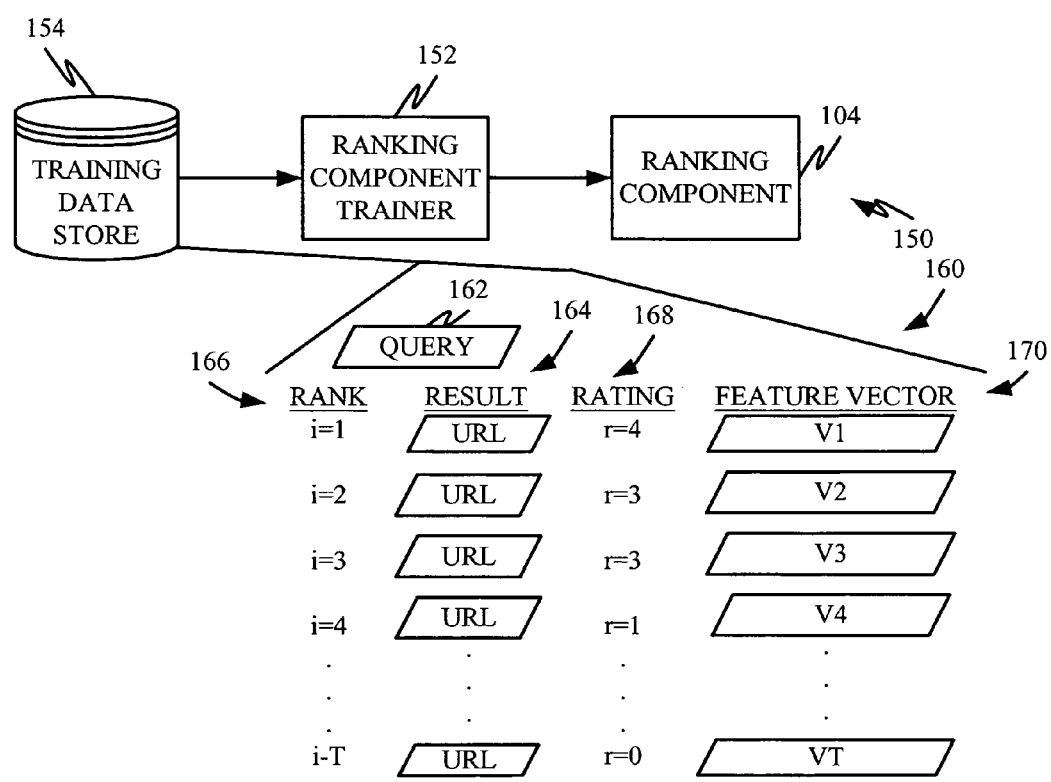
FIG. 2 is a block diagram of a training system for training a ranking component.

FIG. 2 is a block diagram of a training system 150 used to training ranking component 104. In the embodiment illustrated, ranking component trainer 152 receives training data from training data store 154. While training data store 154 is shown as a single data store, the training data can be obtained from a wide variety of different sources. In any case, ranking component trainer 152 receives the training data from data store 154 and trains ranking component 104.

In one embodiment, the training data in data store 154 is formed of a plurality of different records, one of which is illustrated generally at 160 in FIG. 2. The record 160 shows that training data includes a query 162, along with a plurality of results 164. The results can be documents, URLs, video clips, or any of a wide variety of other results. For the purposes of the present discussion, the results are shown as URLs 164. In one embodiment, the URLs are ranked according to relevance by a rank 166. The record illustratively contains a threshold (T) number of search results 164 for any given query 162. The record 160 also includes a rating 168. In the embodiment shown, rating 168 is a score given to the particular search result 164 that indicates its relevance to query 162. As discussed in the background portion, the ratings, in one illustrative embodiment, range from 0-4 and express a relevance of bad (with a score of 0) to perfect (with a score of 4). These ratings are, in one embodiment, given by one or more human evaluators, but could be given automatically also.

Record 160 in FIG. 2 shows that the results are ranked from perfect (4) to bad (0). The number of results, in one illustrative embodiment, truncated at the threshold number T.

Record 160 also illustrates that each result 154 has a corresponding feature vector 170. The feature vectors corresponding to results 154 are indicated by V1-VT and are collectively referred to as feature vectors 170. The particular features in feature vectors 170 can be empirically determined, or determined otherwise. Some exemplary features include, for instance, whether the words in the query appear in the document represented by the URL, whether the words in the query appear in the title of the document, whether anchor text appears in the URL, etc. There may illustratively be several hundred features in each feature vector 170.

A metric is defined in order to rank the set of search results 164 with respect to their relevance to query 162. In other words, the metric illustratively measures how well the ranking component 104 performs in ranking the search results returned by search engine 102. A variety of different metrics can be used to measure this. Also, a plurality of weighted metrics could be used as well. One metric, however, is known and is referred to as normalized discounted cumulative gain (NDCG). Calculating NDCG is performed as follows:

$$NDCG = \frac{1}{N} \sum_{i=1}^{T} \frac{2^r - 1}{\log(1 + i)} \qquad \text{Eq. 1}$$

1/N a the normalization factor and the rest of Eq. 1 is referred to as the discounted cumulative gain. The term $2^r-1$ is referred to as the gain and is an exponential weighting of the ratings (r) 168 of the search results 164. The denominator in Eq. 1 (the term $\log(1+i)$) is a discount factor that emphasizes items that are highly ranked (whatever their label). The truncation level T can be set at any desired number, such as 1, 3, 10, etc. The idea is that the metric should focus on providing a high value when top rated results are placed in the top positions of the ranked list of search results. The NDCG score should also be penalized for putting a high rated result far down the list, and therefore the denominator in Eq. 1 discounts this, accordingly.

It can be seen from Eq. 1 that if all the results for a given query were ranked in perfect order, then the discounted cumulative gain (DCG) would also be equal to N. Therefore, the NDCG score would be 1. Normally, however, NDCG for a given query is between 0 and 1, and each query is scored with its own NDCG. Therefore, when determining a maximum possible NDCG, it is computed over the positions of the URLs (or other search results) for a given query. Also, the NDCG score for a set of queries is determined by simply calculating an NDCG score for each individual query and averaging them. Of course, other combinations of individual NDCG scores could be used as well.

It can be seen that the NDCG score depends only on the order of the documents (or URLs) returned as search results, and on the labels of those URLs. It does not depend directly on a continuously changing score. Therefore, if the parameters used to rank the search results are changed, so the scores for the given search results change but the rank order of the results does not change, then the NDCG value does not change at all. However, if the parameters in the ranking component are changed so that the order changes, then the NDCG value jumps to a new value. Thus, the NDCG function is either flat, with no gradient at all telling which direction to go in terms of optimization, or it is discontinuous. Both properties render standard hill climbing techniques useless in optimizing the function.

Figure 3A:
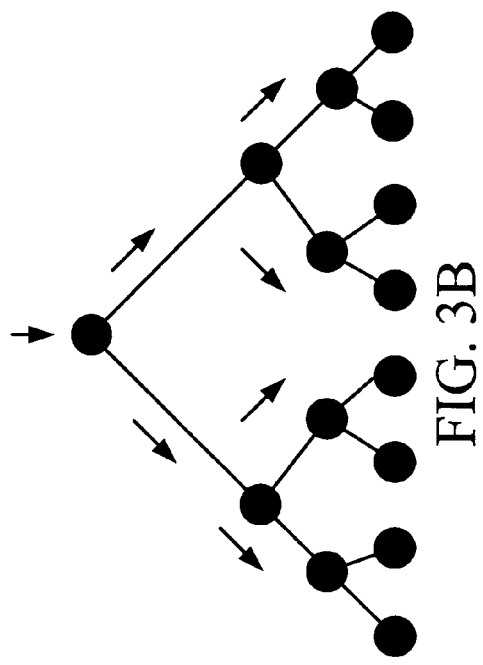
FIGS. 3A and 3B illustrate two different examples of dependency structures.
Figure 3B:
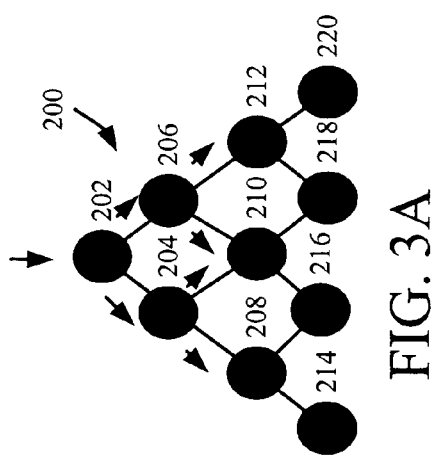

In accordance with one embodiment, ranking component 104 is a dependency structure that is trained to receive feature vectors corresponding to search results generated by search engine 102 in response to a query 106. The dependency structure then evaluates the feature vectors to rank the search results and provides the ranked list of results 114 back to the user. FIGS. 3A and 3B illustrate two different dependency structures that can be used, although they are not intended to limit the invention. FIG. 3A shows a directed acyclic graph dependency structure 200. Dependency structure 200 includes a plurality of nodes 202, 204, 206, 208, 210, 212, 214, 216, 218 and 220.

In order to rank search results during runtime, the samples for the search results (which illustratively include a page result, its feature vector or set of features, and the query that spawned the result) are fed into dependency structure 200 first at node 202. Dependency structure 200, at node 202, decides to send each of the samples either left (to node 204) or right (to node 206), based upon a feature value of a feature in the feature vectors. Assuming that a sample is sent left, to node 204, node 204 then decides to send the sample either left or right (i.e., to nodes 208 or 210, respectively) based on a feature value of a feature in the feature vector, as well. Therefore, training dependency structure 200 involves identifying the particular feature, and feature value, used to decide which direction the sample is sent, at each node. As the samples descend the dependency structure 200, they eventually end up at one of leaf nodes 214-220, and the ranking is encoded by the position of the leaf nodes at which the samples reside. In one embodiment, the decision nodes in dependency structure 200 are trained such that the samples for more relevant search results end up further to the left among leaf nodes 214-220, and are therefore ranked above the search results corresponding to samples that end up further to the right among the leaf nodes 214-220. Of course, dependency structure 200 can be trained such that the more relevant results end up on the right.

FIG. 3 shows another dependency structure 250. Dependency structure 250 is a binary tree. The difference between binary tree 250 and directed acyclic graph 200 is that, in binary tree 250, each node has at most one parent node. While either dependency structure 200 or 250 (or any other dependency structure or directed acyclic graph) can be used, the present discussion will proceed with respect to dependency structure 200.

Figure 4:
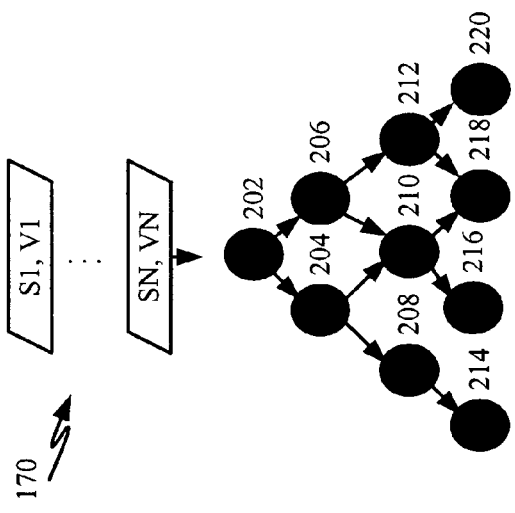
FIG. 4 illustrates feature vectors applied to a dependency structure.
Figure 4A:
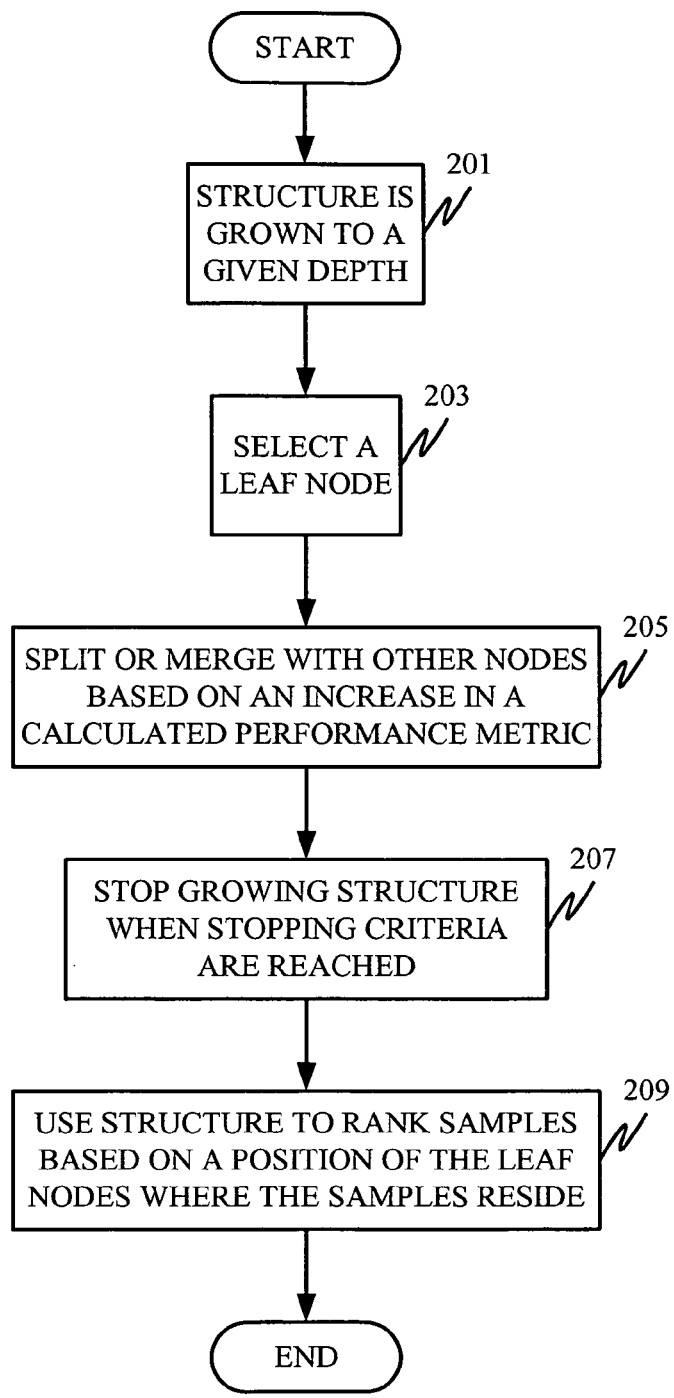
FIG. 4A is a flow diagram illustrating one embodiment for generating a dependency structure.

FIG. 4 shows dependency structure 200 with a plurality of samples S1-SN, with corresponding feature vectors V1-VN (collectively referred to as samples 170) from training data 160 applied during training. FIG. 4A describes an overall, general way in which a dependency structure can be trained to rank samples. Assuming first that the structure 200 is grown to a given depth, in order to grow the structure further, a leaf node in the structure is selected. This is indicated by blocks 201 and 203 in FIG. 4A. At each node in the dependency structure, it will be decided whether to send a sample left or right, based upon a feature value in the feature vector V1-VN, under consideration. Therefore, the selected leaf node will have a set of samples in it. One way for determining which features and feature values to use is discussed below with respect to FIGS. 5A and 5B.

In any case, trainer 152 decides either to split the selected leaf node or merge it with another leaf node based on an increase in a calculated performance metric. This is indicated by block 205 in FIG. 4A. It will be noted that the dependency structure can be any arbitrary directed acyclic graph, and determining whether and how to split the selected leaf node or to merge two nodes can be done in a variety of different ways. For instance, if NDCG is used as the performance metric, then merging two nodes will always result in a decrease in the NDCG score. Therefore, when doing a merge, trainer 152 can split the newly merged node, and split each of its children, in turn. Thus, each time, the total number of nodes grows by only one and the NDCG calculated for each of the operations is compared to a simple split operation, in which the node is split, to decide whether to merge the selected leaf node with another node, or to split it. It should also be noted that the gain in NDCG can be weighted based on whether the operation being performed is merging or splitting. This allows trainer 152 to control how fast the directed acyclic graph grows.

The directed acyclic graph is then grown until some stopping criteria is reached. For instance, the structure can grow until there is no further increase in the performance metric, or it can grow until the increase is below a given threshold value. This is indicated by block 207 in FIG. 4A.

Once the structure is grown to the desired degree, it can be used to rank samples. This is done by applying samples to the dependency structure and determining their relative rank with respect to one another based upon the left-to-right (or right-to-left) location of the leaf node in the dependency structure in which the sample resides. This is indicated by block 209 in FIG. 4A.

Figure 5A:
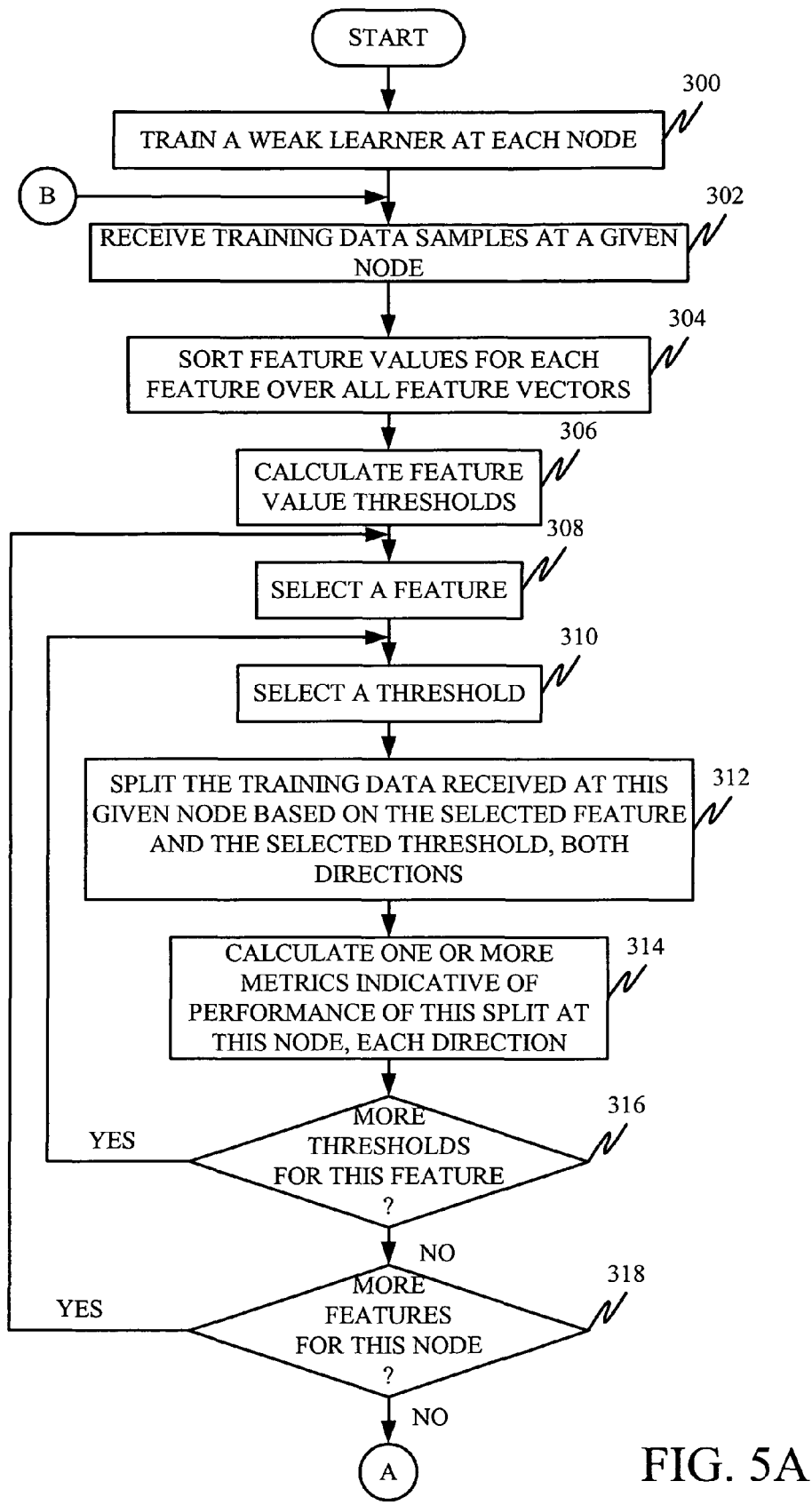
FIGS. 5A and 5B show a flow diagram illustrating one illustrative embodiment of the operation of the system shown in FIG. 2.
Figure 5B:
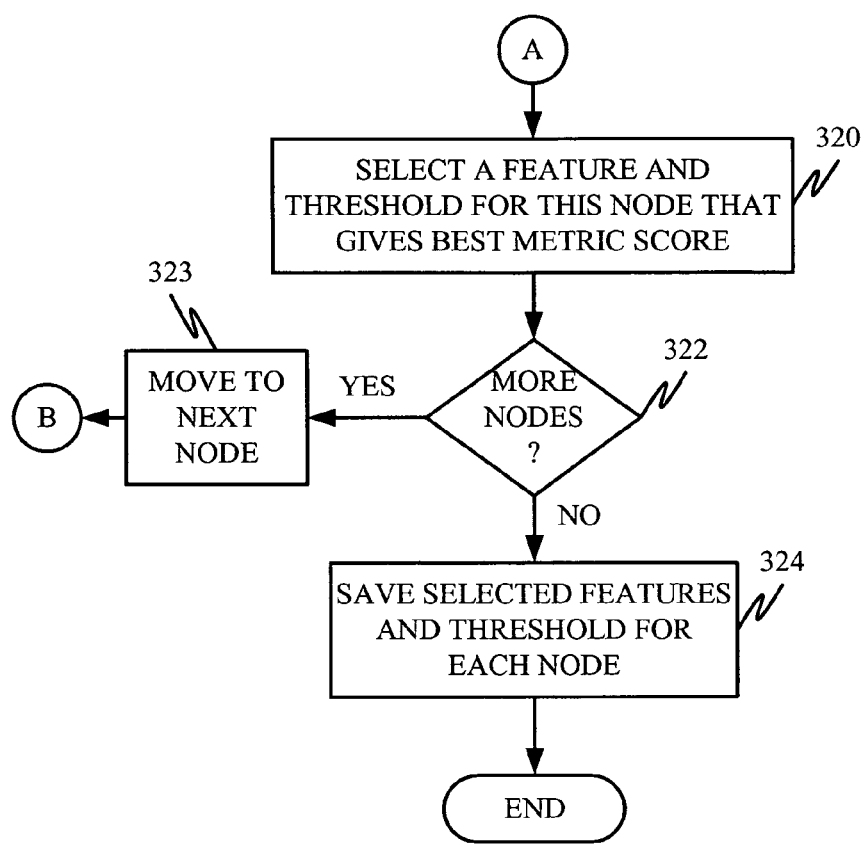

FIGS. 5A and 5B show a flow diagram illustrating the overall operation of system 150 in FIG. 2 in training dependency structure 200 in more detail. FIGS. 4, 5A and 5B will now be discussed in conjunction with one another. It will also be noted, of course, that dependency structure 200 may have a depth in the range of hundreds or thousands. It is shown as having a depth of 4 for the sake of example only.

In order to train dependency structure 200, trainer 152 (from FIG. 2) first trains a weak learner at each node 202-220. The weak learner [user1] can be trained using any known training mechanism and simply initializes each of the nodes to make a decision based on some feature value of some given feature in feature vectors V1-VN of samples 170. Training a weak learner is indicated by block 300 in FIG. 5A.

Trainer 152 then receives the training data samples 170 and passes them through the nodes of dependency structure 200. The mechanism by which all nodes are trained to split the data (passing some samples left and some right) is in one embodiment, the same. Training of node 202 will therefore be described for the sake of example. Thus, trainer 152 receives the training data samples 170 and applies them to node 202. This is indicated by block 302 in FIG. 5A.

Next, trainer 152 finds the best feature and specific value for that feature upon which a decision can be made as to how to split the samples at each node. Techniques for doing this are known in building decision trees and any desirable technique can be used. One is described here with respect to FIGS. 5A and 5B for the sake of example only.

Figure 4B:
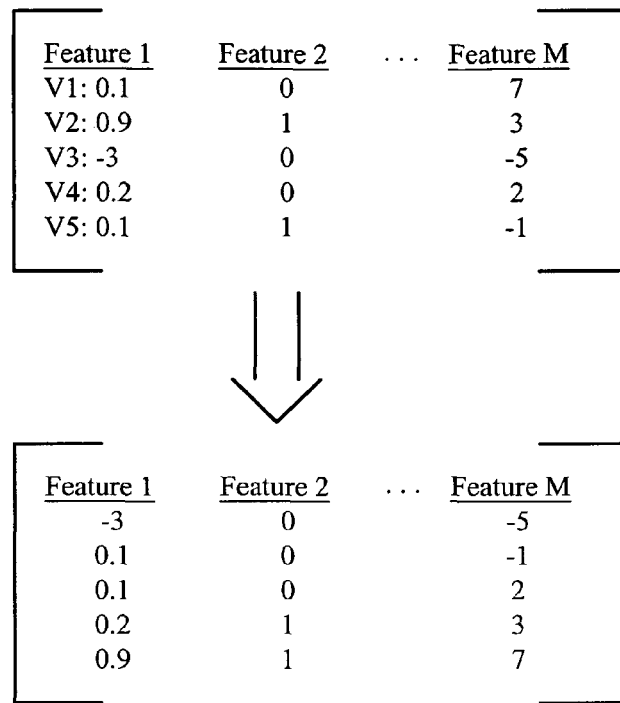
FIG. 4B shows a set of feature vectors and vectors sorted by feature value.

In an exemplary embodiment, trainer 152 sorts the feature values for each feature over all feature vectors in samples 170. FIG. 4B shows a set of five feature vectors, each feature vector having M features. The values for three of the M features are shown, for the sake of example only, in FIG. 4B. For example, feature vector V1 has a value for feature 1 of 0.1. V1 also has a value for feature 2 of 0 and for feature M of 7. Feature 2 has values of 0.9, 1 and 3 for features 1, 2 and M, respectively. The values for each of the features 1-M are sorted over all feature vectors. In the embodiment discussed herein, the features are sorted from lowest to highest among the feature vectors. Therefore, the bottom set of feature vectors in FIG. 4B shows the arrangement of the values of the feature vectors, after the values have been sorted from lowest to highest. The values for feature 1 have been sorted, for example, as follows:

−3, 0.1, 0.1, 0.2, 0.9.

The values for feature 2 have been sorted as follows:

0, 0, 0, 1, 1, and the values for feature M have been sorted as follows:

−5, −1, 2, 3, 7.

Sorting the feature values for each feature over the set of training data feature vectors is indicated by block 304 in FIG. 5A.

Figure 4C:
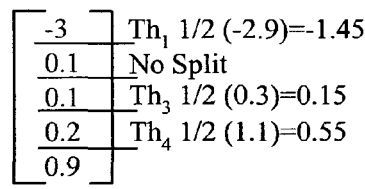
FIG. 4C shows feature value thresholds.

Trainer 152 then sets feature value thresholds given the sorted feature values. In the embodiment described herein, trainer 152 finds the halfway point between each pair of feature values across the feature vectors and identifies those halfway points as potential thresholds. For instance, FIG. 4C shows a calculation of the thresholds for feature 1. It can be seen that the halfway point between the first two feature values is calculated as follows: ½ (−3+0.1)=½ (−2.9)=−1.45.

Therefore, the threshold between the first two feature values of feature 1 is −1.45. The next pair of feature values are the same (0.1) and therefore no threshold can be set for them. The threshold for the next pair of feature vectors is calculated as follows: ½ (0.1+0.2)=½(0.3)=0.15. Therefore, the threshold for that set of feature values is 0.15. The final threshold between the last pair of feature values is calculated as follows:

½(0.2+0.9)=½(1.1)=0.55.

Therefore, the threshold value between that set of feature values is 0.55. Trainer 152 performs this calculation for all pairs of feature values for every feature across all feature vectors. Calculating the feature value thresholds is indicated by block 306 in FIG. 5A.

Recall that, during this training of ranking component 104 (implemented as dependency structure 200) trainer 152 is attempting to identify a specific feature and a specific value of that feature upon which a decision can be made, at the given node being trained, as to whether to send samples left or right in the dependency structure 200. For instance, assume that at node 202 the first threshold value (−1.45) for feature 1 is the selected feature and threshold. In that case, assume also that a direction has been selected such that all samples having a feature value for feature 1 of greater than −1.45 are passed to the left down the dependency structure and all other samples are passed to the right. In order to determine the exact feature and exact threshold to use at the node being trained, trainer 152 tries all combinations of features and thresholds, and also tries sending the samples both directions, in order to find the proper feature with the proper threshold, passing samples in the proper direction.

Therefore, once the feature value thresholds have been calculated as in block 306, trainer 152 selects a feature. For the sake of discussion, it will be assumed that trainer 152 selects feature 1. Selecting a feature is indicated by block 308 in FIG. 5A. Trainer 152 then selects a threshold for that feature. Assume also for the sake of the present example that trainer 152 selects the first threshold (−1.45) for feature 1. Selecting a threshold is indicated by block 310 in FIG. 5A.

Trainer 152 then applies all of the samples 170 in the training data that have thus far reached the node being trained (here, the node being trained is the top node, node 202, so all samples 170 will be applied) and splits the training data received at the given node based on the selected feature and the selected threshold. Trainer 152 thus sends all samples 170 that have a value for feature 1 in excess of −1.45 to the left (i.e., to node 204) and sends all the remaining samples to the right (i.e., to node 206).

Trainer 152 then calculates a metric indicative of ranking performance of this split, at this node. The metric calculated in accordance with the present example is the NDCG value after the data has been split at the selected threshold for the selected feature. Splitting the training data and calculating the NDCG value are indicated by blocks 312 and 314, respectively.

As discussed above, trainer 152 tries sending the samples in both directions, and determines which direction gives the highest NDCG score. Therefore, trainer 152 first splits the data by sending samples above the threshold to the left and the remaining samples to the right, and then splits the data by sending the samples having the feature value above the threshold to the right, and the remaining samples to the left. The NDCG score is calculated for each of these potential splits. Therefore, trainer 152 can determine whether ranking component 104 (dependency structure 200) performs better by splitting the data using threshold 1 of feature 1 and sending samples above the threshold to the left or to the right simply by calculating the NDCG score for each scenario.

Trainer 152 then performs this calculation for all thresholds for feature 1. Trainer 152 then determines whether all the thresholds for the selected feature (feature 1) have been tested. This is indicated by block 316. If not, then processing reverts back to block 310 where the next threshold (0.15) is selected and the process is repeated.

However, if all thresholds for the selected feature have been tested, then trainer 152 determines whether there are more features to be examined at the node being trained (here, node 202). This is indicated at block 318 in FIG. 5A. For instance, if all the threshold values for feature 1 have been processed, then, at block 318, trainer 152 selects the next feature (here, feature 2) and begins examining splitting the data according to the threshold values calculated for feature 2. Once all of the feature value thresholds for all of the features in the training data samples have been examined, trainer 152 selects the particular feature and threshold (and direction) for the node being trained (here, node 202) that gives the best metric score (e.g., the best NDCG score). That value is saved for use during runtime. Selecting the feature and threshold (and direction) for the given node is indicated by block 320 in FIG. 5B.

Trainer 152 then determines whether there are more nodes to be trained in dependency structure 202. This is indicated by block 322 in FIG. 5B. If so, the next node is selected (as indicated by block 323) and processing reverts back to block 302 and the training data samples are applied to the next node in dependency structure 200. It will, of course, be understood that each node to be trained in dependency structure 200 is only trained on the training data samples that descend down to it through dependency structure 200. Therefore, a decision is made at node 202 how to split the training data samples, sending them to nodes 204 and 206. Node 204 will only be trained on the training data samples that are sent to it by node 202. The same is true of node 206. Therefore, each of the nodes is trained on a different set of training data samples, such that, at each level in dependency structure 200, the problem of identifying a feature and threshold gets smaller and smaller because the amount of training data applied to each node gets smaller.

Once trainer 152 has thus processed every node in dependency structure 200, it has thus identified a feature and threshold value that forms the basis of a decision point for splitting data, at each node. The features and thresholds for each node are then saved so that they can be used during runtime in order to rank samples corresponding to URLs in information retrieval search results. Saving the features and thresholds is indicated by block 324 in FIG. 5B.

Figure 5C:
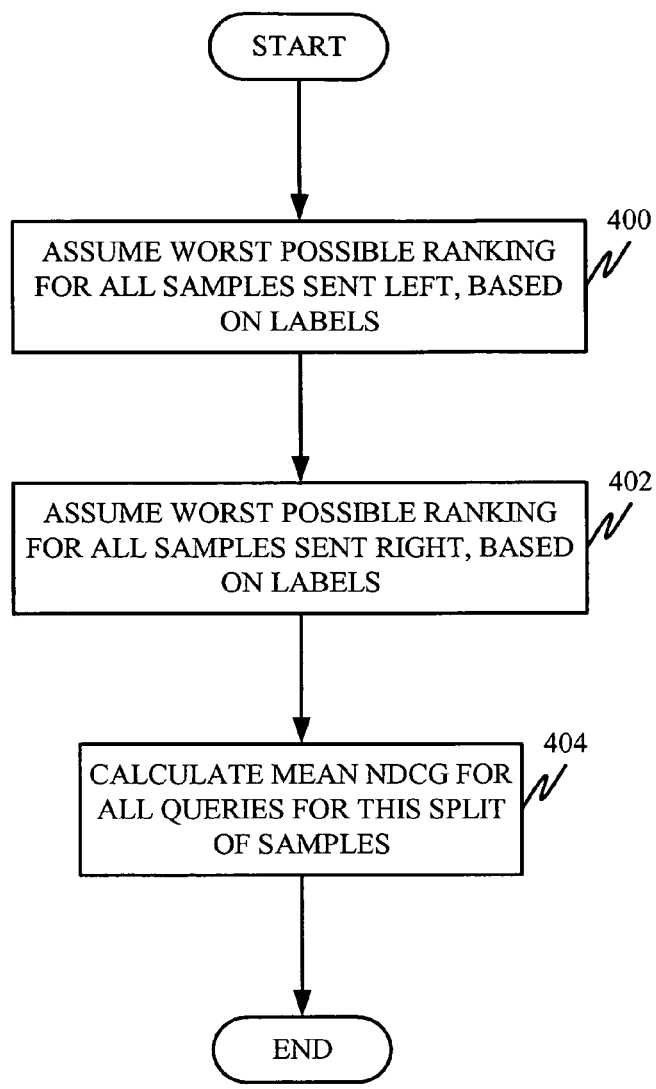
FIG. 5C is a flow diagram better illustrating the calculation of NDCG as the utility cost function.

FIG. 5C is a flow diagram illustrating one illustrative embodiment of the operation of trainer 152 in calculating the NDCG score as indicated by block 314 in FIG. 5A. Again, assume for the sake of the present example that node 202 is being trained and that a threshold and feature are being tested such that the samples 170 have been split and sent, some to node 204 and some to node 206. After this split, there are only two sets of samples to be considered in calculating the NDCG score, but those samples are unordered. For instance, node 204 has a set of unordered samples which comprises the samples sent to it by node 202. Similarly, node 206 has a set of samples sent to it by node 202, but they are unordered as well.

It will be recalled from FIG. 2, however, that each sample (with its feature vector) has a corresponding rating 168 (or label). In order to calculate the NDCG score for the split, trainer 152 first assumes the worst possible ranking for all samples sent left (i.e., to node 204) based on the labels. For instance, assume there were a set of samples that have a perfect ranking and a set of samples that have a bad ranking. Trainer 152 would assume that at node 204, all the bad rankings are ordered ahead of all the perfect rankings. Assuming the worst possible ranking for all samples sent to the left, based on the labels, is indicated by block 400 in FIG. 5A. It will also be noted that assuming the worst possible rankings is exemplary only. Other assumptions could be made as well, such as assuming that the sample occupies each possible rank with equal probability, for instance.

Trainer 152 then assumes the same for all samples sent to the right (i.e., to node 206). This is indicated by block 402 in FIG. 5A. Trainer 152 then calculates the mean NDCG, for all queries, for this split of samples, assuming the worst possible rankings. This is indicated by block 404 in FIG. 5A.

Thus, all that is being determined based on this split is that all samples sent to the left in dependency structure 200 lie above all samples sent to the right in dependency structure 200. It can thus be seen that, by performing these calculations, trainer 152 is attempting to find the split (based on a feature and feature value threshold) that gives the maximum value of the minimum NDCG score. This directly maximizes the NDCG score as training advances through dependency structure 200. In fact, it can be shown that, where the worse possible ranking is assumed, the NDCG score at each iteration (at each level in dependency structure 200) increases monotonically. Therefore, the very metric which is used to determine the performance of ranking component 104 is, in accordance with this embodiment, increased monotonically with each training step conducted through each level of dependency structure 200. This is in contrast to prior methods in which, during training, the NDCG score would jump discontinuously back and forth.

Figure 6A:
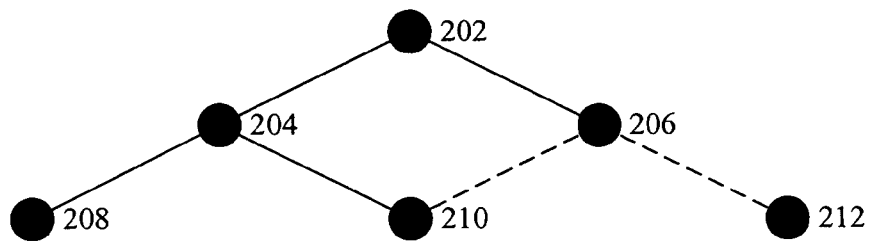
FIG. 6A illustrates a dependency structure.

FIG. 6A illustrates a portion of dependency structure 200. For purposes of the discussion of FIG. 6A, assume that node 202 has been trained such that some training data samples have been sent to node 204 and some to node 206. Now training proceeds with respect to node 204. Node 204 is trained in a similar way to node 202, such that a feature and threshold are selected as a decision point to send some of the training data samples to node 208 and some to node 210. Now, assume that node 206 is to be trained to split the training data samples. This can optionally be a bit more involved. When splitting the training data samples provided to node 206 (sending some to node 210 and some to node 212) it can be seen that node 210 will already have some training data samples in it (those sent from node 204). Therefore, once node 206 is trained, the training data samples sent from node 206 are taken as a union with those training data samples already in node 210 (which were sent from node 204). In other words, the set of training data samples in node 210 is the union of those training data samples sent from node 204 and those training data samples sent from node 206.

Figure 6B:
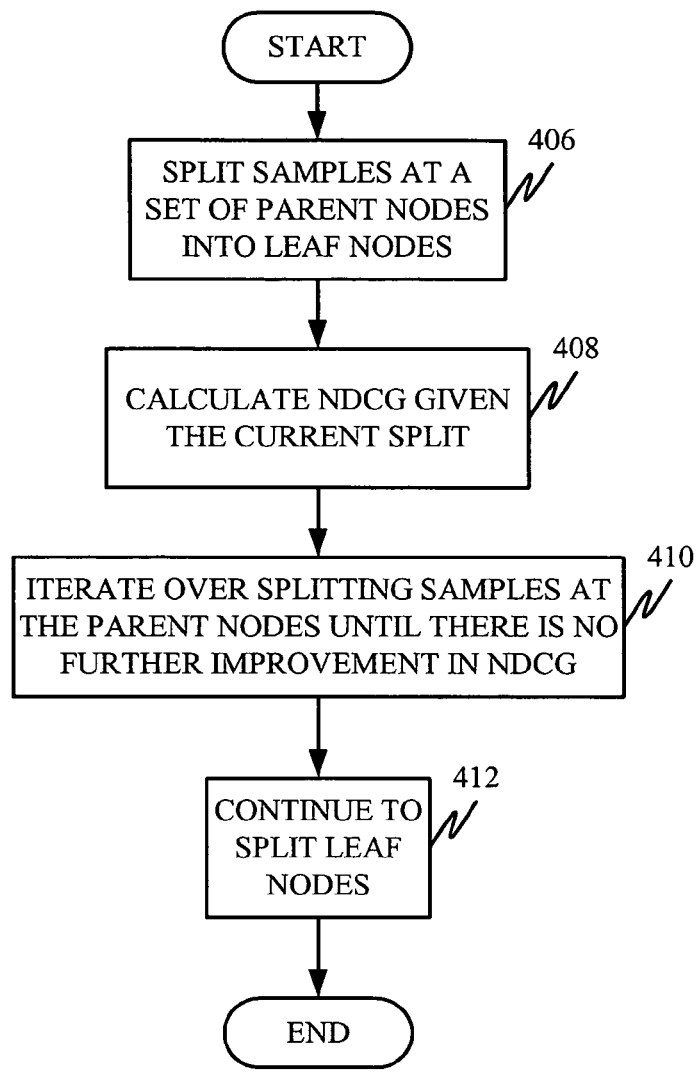
FIG. 6B is a flow diagram illustrating one embodiment of the operation of the system shown in FIG. 2 in performing a detailed balance during training of the dependency structure.

It may be that the split at node 204 would have been different, had the training data samples sent from node 206 been considered in calculating the NDCG score when training node 204. Therefore, trainer 152 iterates on training nodes 204 and 206, computing the NDCG score for each query to obtain the largest increase in NDCG score. This iterative process is referred to herein as detailed balance. FIG. 6B is a flow diagram better illustrating the operation of trainer 152 in performing this detailed balance.

First, trainer 152 splits the training data samples at a set of parent nodes (here nodes 204 and 206) sending some of those samples to the various leaf nodes (nodes 208-212). This is indicated by block 406 in FIG. 6B. Trainer 152 then calculates the NDCG score for the current split. This is indicated by block 408 in FIG. 6B. It might be, however, that because the membership of samples at node 210 has changed from what it was originally assumed when training node 204, trainer 152 goes back and refigures the split (again trying the different features and thresholds and directions) now that it knows what samples have been sent to node 210 from node 206. Trainer 152 does this in order to determine whether it can obtain an improvement in NDCG score over that originally obtained. If a different split is identified at node 204, other than the one identified when it was initially trained, then trainer 152 refigures the split at node 206 as well. If the split at node 206 changes, based on the change in split at node 204, then trainer 152 again goes back to node 204 and retrains it. Iterating over how to split the samples at the parent nodes 204 and 206 until there is no further improvement in NDCG score is indicated by block 410 in FIG. 6B.

Trainer 152 then drops to the next level and begins training nodes 208-212, in the same way as discussed above. This is indicated by block 412 in FIG. 6B.

Of course, in order to iterate over the nodes in this fashion, for a given query, all that is needed to calculate the change in NDCG score is knowledge of how many samples lie upstream and, for each of those samples, what its label (rating) is. Thus, all that is needed is a vector that includes five numbers (the number of samples lying upstream that have each of the different five ratings (0-4)). This allows trainer 152 to compute the NDCG score based on what lies upstream of the given node being trained.

Figure 7A:
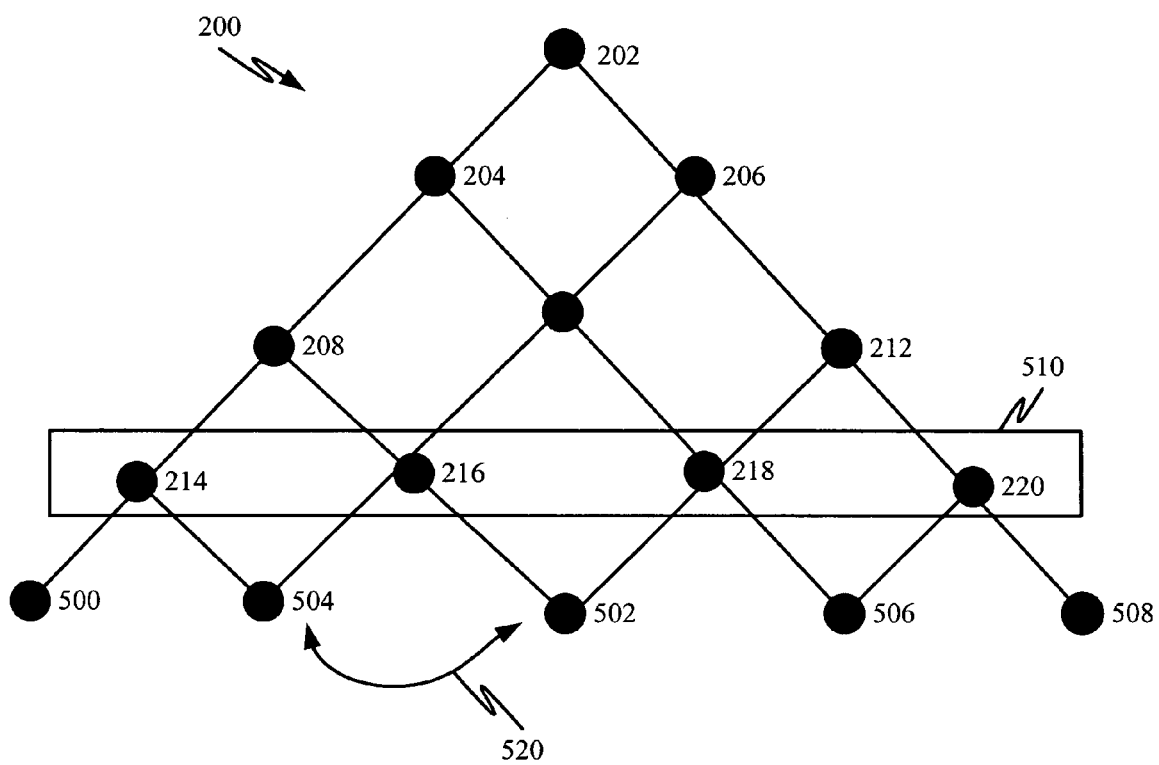
FIG. 7A illustrates a dependency structure of level 5.
Figure 7B:
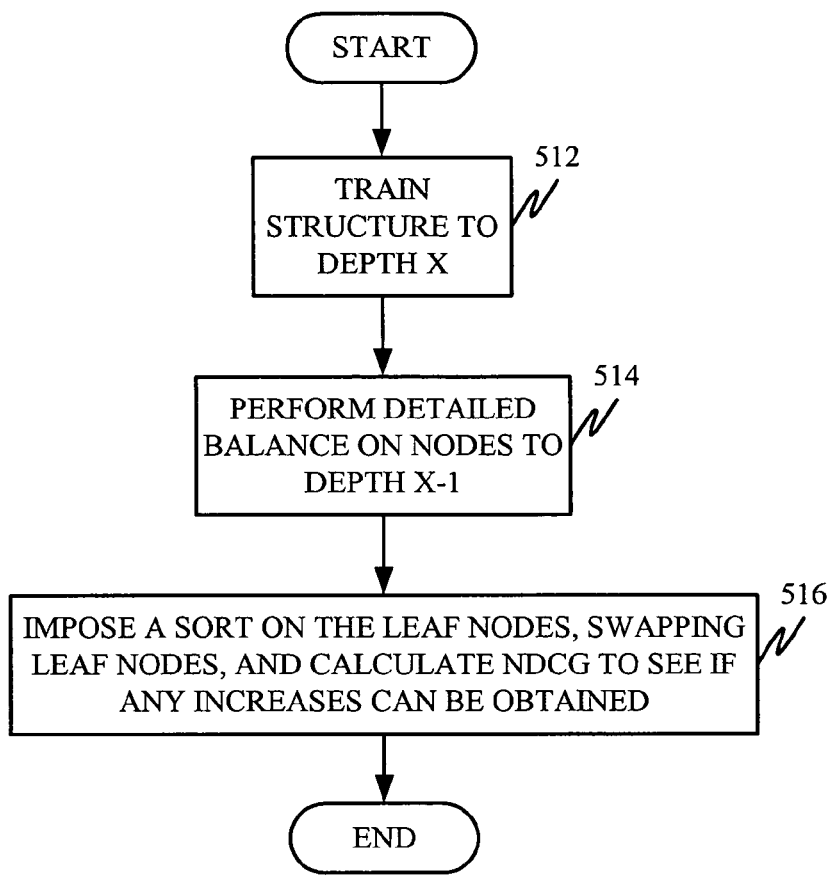
FIG. 7B is a flow diagram illustrating one embodiment of the operation of the system shown in FIG. 2 in imposing a sort on the structure shown in FIG. 7A.

In accordance with another embodiment, additional processing is also performed in order to determine whether further increase in performance can be obtained. FIG. 7A shows data structure 200 with an additional, fifth layer of nodes (nodes 500-508) added to it. It will be assumed for the sake of the present discussion that dependency structure 200 has been trained to a depth of 5, as shown in FIG. 7A. It can also optionally be assumed that the detailed balance discussed above with respect to FIGS. 6A and 6B has been performed for the nodes in the penultimate layer of data structure 200 (nodes 214-220 indicated collectively as layer 510). Trainer 152 then determines whether, simply by swapping the order of the leaf nodes 500-508, an increase in NDCG score can be obtained. FIG. 7B is a flow diagram illustrating one illustrative embodiment of the operation of the trainer 152 in imposing this type of sort.

Trainer 152 first trains dependency structure 200 to a desired depth X (here the depth is 5). This is indicated by block 512 in FIG. 7B. Next, trainer 152 optionally performs the detailed balance discussed above with respect to FIGS. 6A and 6B on the nodes to depth X-1 (here to the layer 510 or depth 4 in FIG. 7A). This is indicated by block 514. Trainer 152 then imposes a sort on the leaf nodes 500-508, swapping the order of leaf nodes, and calculating the NDCG score to see if any increases can be obtained. This is indicated by block 516 in FIG. 7B.

Figure 7C:
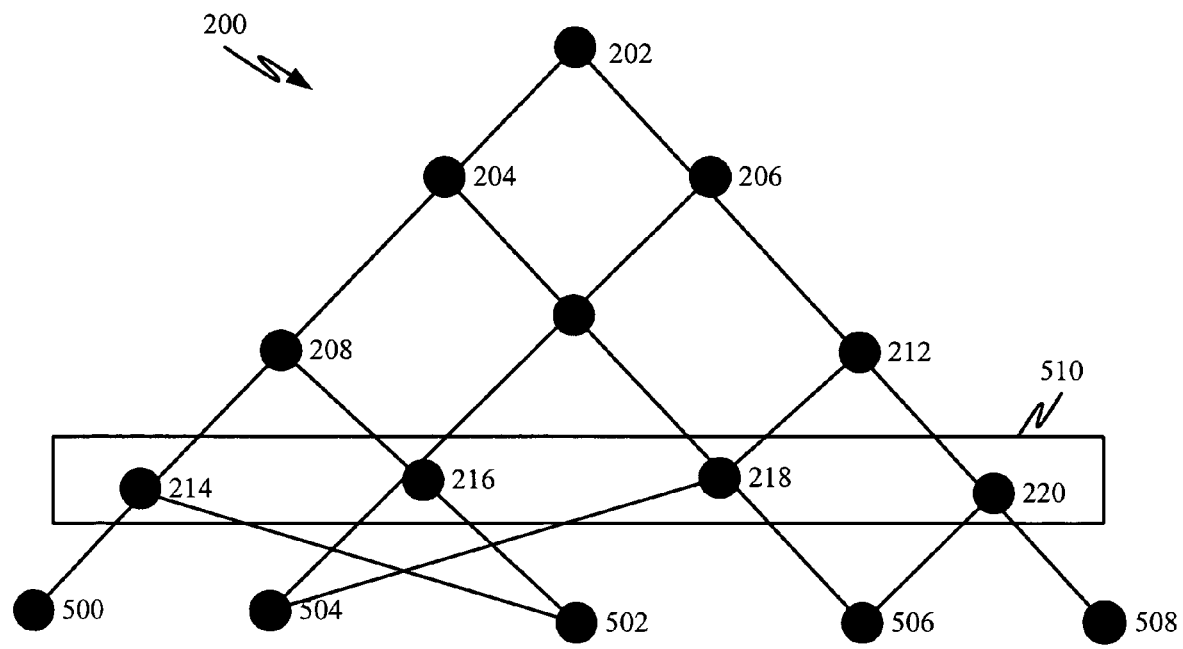
FIG. 7C shows the structure illustrated in FIG. 7A, with two leaf nodes swapped.

FIG. 7C shows dependency structure 200 after a sort has been imposed, and after the order of nodes 502 and 504 has been swapped inside the dependency structure. This is indicated by arrow 520 in FIG. 7A and the resultant dependency structure 200 (with nodes 502 and 504 swapped) is shown in FIG. 7C. Processing can optionally continue by simply swapping different pairs of leaf nodes 500-508, and then calculating the NDCG score, in order to obtain the optimal order of the leaf nodes 500-508 that yield the largest increase in NDCG score.

While the above discussion has been directed to training a ranking structure by optimizing NDCG, it can optimize other functions or different functions as well. For instance, the same procedure can be performed, optimizing multiple ranking functions simultaneously (as mentioned in block 314 of FIG. 5A) by weighting them. Similarly, the dependency structure can be completely trained (so that by further splitting, no increase in performance is gained), or it can be trained to a desired depth, or splitting can continue so long as a sufficient increase in performance is obtained (e.g., so long as there is at least a threshold level of increase in NDCG).

It should be noted that using NDCG to decide on the best split of nodes in growing a dependency structure can be adapted to apply more globally as well. In other words, the NDCG calculation described above is made on a purely local level. If a query has N samples in a given node, and all those samples have the same label, then no split of that node changes the NDCG for that query. Therefore, those samples have no incentive to move right or left as the dependency structure grows. Thus, in one embodiment, assume that a dependency structure (directed acyclic graph) is being trained and has a plurality of leaf nodes. Every sample in the training data occurs in one, and only one, leaf node. However, the samples for a given query can be strewn across several leaf nodes. A force is attached to each sample, based on where it currently ranks with respect to all other samples (with different labels) for the given query. The force can be chosen in a variety of different ways.

Figure 7D:
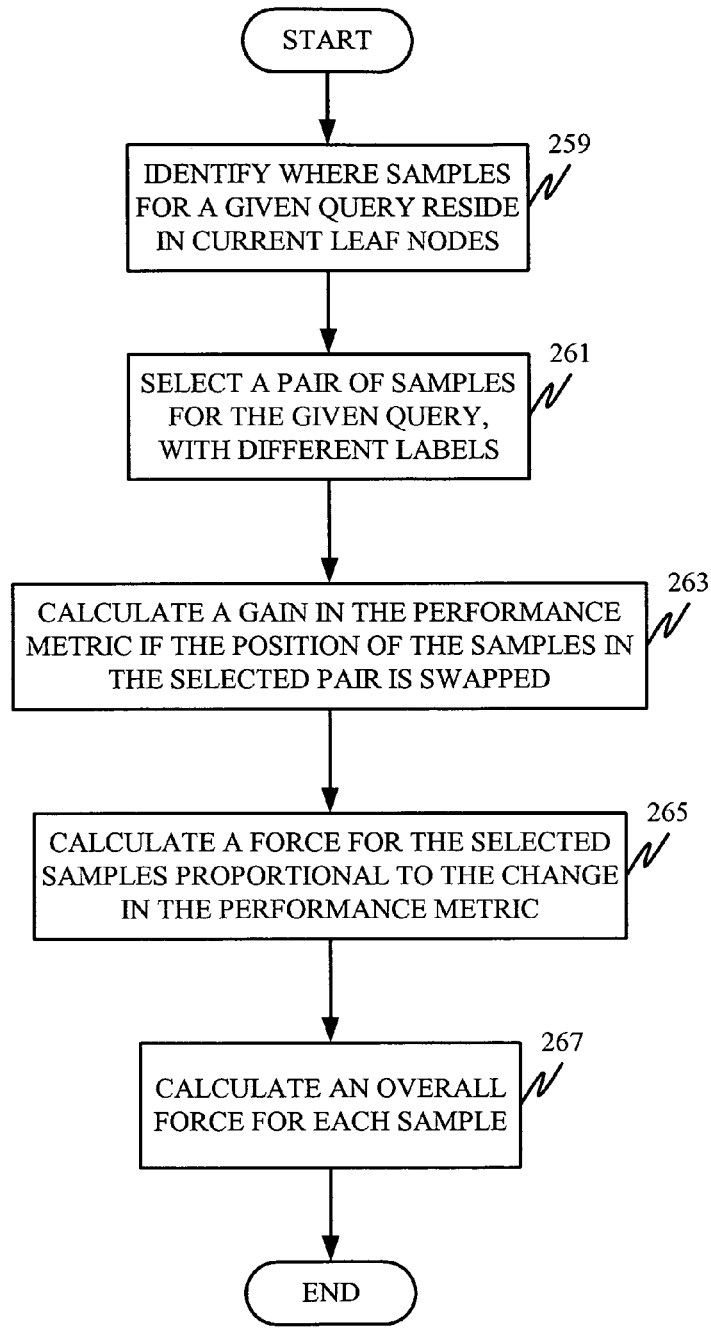
FIG. 7D is a flow diagram illustrating one embodiment of assigning a force to each sample.

FIG. 7D is a flow diagram illustrating one way in which forces can be assigned to samples. Trainer 152 first identifies where samples of a given query reside in current leaf nodes of the directed acyclic graph. This is indicated by block 259 of FIG. 7D. The trainer next selects a pair of samples for the given query, that have different labels. This is indicated by block 261. Trainer 152 then calculates a gain in the performance metric (e.g., the NDCG) if the position of the samples in the selected pair are swapped. This is indicated by block 263 in FIG. 7D. This is performed for every pair of samples that have different labels, for the given query. All the forces calculated for each sample are added up to give a single overall resultant force for each sample. Calculating the force as being dependent upon the change in the performance metric is indicated by block 265 in FIG. 7D, and calculating an overall force for each sample is indicated by block 267 in FIG. 7D.

In this way, each sample will be encouraged to move in the correct direction, based on all other samples for the given query, even if those samples reside in different leaf nodes in the dependency structure. It should also be noted that a constant force can be added to each sample, based only on its label, so that in the absence of other forces, that sample still moves in the correct direction.

Figure 8A:
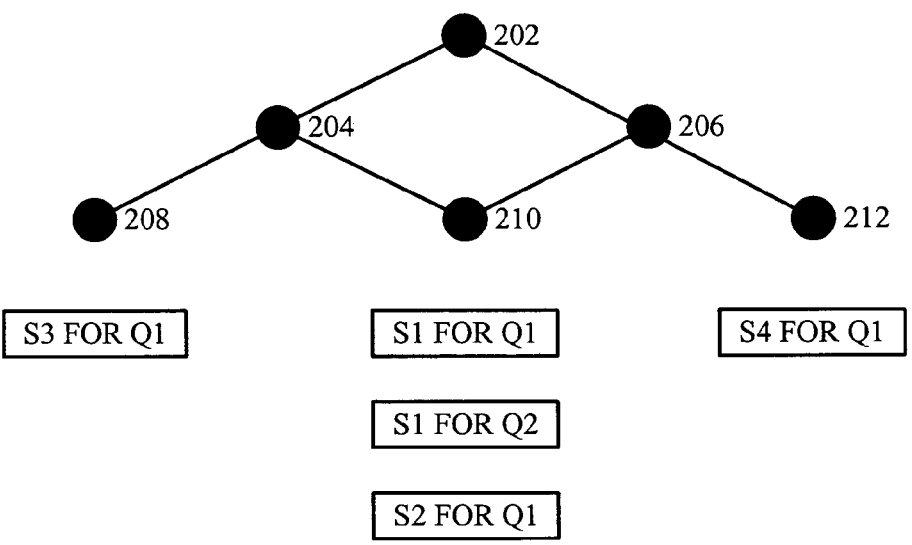
FIG. 8A shows a dependency structure with a degenerate leaf node.

The problem of ranking samples at degenerate nodes is now discussed. Assume, during runtime, that a set of samples, corresponding to search results, is applied to dependency structure 200. Assume also, for the sake of the present discussion, that dependency structure 200 has only been trained to a depth of three. This structure is indicated by FIG. 8A. It may be, then, that more than one sample for a given query ends up at a single leaf node. In the example shown in FIG. 8A, it can be seen that sample S1 for query 1, and sample S2 for query 1 both end up at leaf node 210 in dependency structure 200. It can also be seen that sample S1 for a second query (Q2) ends up at node 210, sample S3 for query 1 ends up at node 208 and sample S4 for query 1 ends up at node 212.

Thus, based on this runtime processing, the result corresponding to sample S3 for query 1 will be rated ahead of all other samples for query 1. Also, the result corresponding to sample S4 for query 1 will be rated lowest. However, it cannot be determined from the processing thus far whether sample S1 should be rated ahead of sample S2, or vise versa, since both have ended up at the same leaf node 210. Thus, node 210 is referred to as a degenerate node. One way to handle this type of problem is simply to train an alternate ranking mechanism (such as a neural network or a heuristic ranking mechanism) and to take samples S1 and S2 for query 1 (both of which ended up at degenerate node 210) and apply the alternate ranking mechanism.

Figures 8B, 9C:
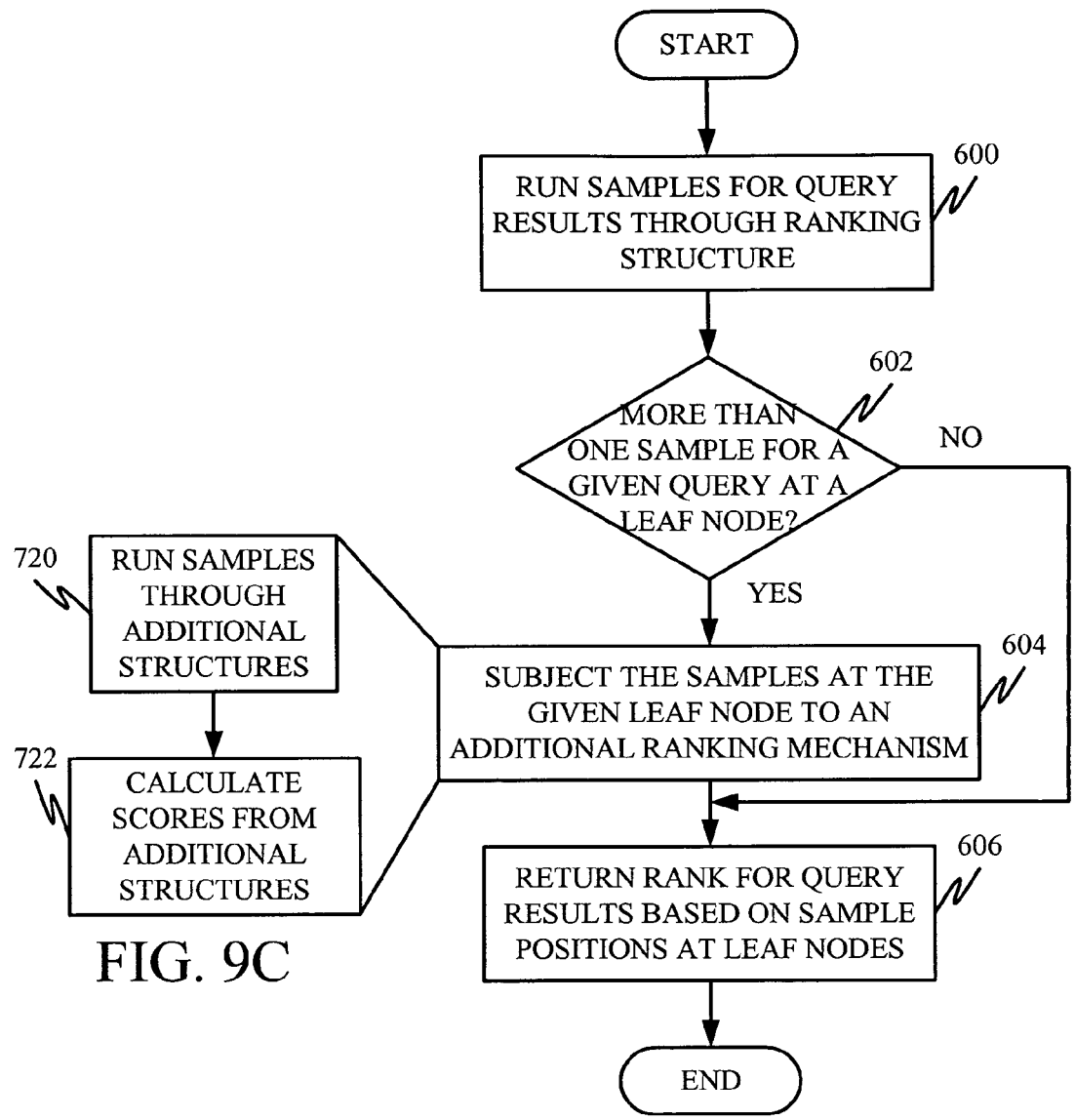
FIG. 8B is a flow diagram illustrating one illustrative embodiment of the runtime system shown in FIG. 1, in ranking feature vectors at degenerate nodes.
FIG. 9C shows the use of additional dependency structures.

FIG. 8B is a flow diagram illustrating the operation of search engine 102 in ranking results during runtime, where degenerate nodes may exist. First, search engine 102 runs the samples for the query results through the ranking dependency structure 200 (or ranking component 104 in FIG. 1). This is indicated by block 600 in FIG. 8B. Next, search engine 102 determines whether there are more than one samples for a given query at a single leaf node. This is indicated by block 602 in FIG. 8B. In the example being discussed, search engine 102 will note that both samples S1 and S2 for query 1 have ended up at node 210. Therefore, search engine 102 will subject those samples at the given leaf node 210 to the alternate (or additional) ranking mechanism. This is indicated by block 604 in FIG. 8B.

This alternate ranking mechanism will thus impose a ranking on samples S1 and S2, within the ranking imposed by dependency structure 200. Thus, for example, if the alternate ranking mechanism ranks S1 ahead of S2, then the order for the search results for query 1 will be those corresponding to the samples as follows: S3, S1, S2, S4. If, on the other hand, the alternate ranking mechanism ranks S2 ahead of S1, then the order for the search results of query 1 will be those corresponding to the samples as follows: S3, S2, S1, S4. In any case, search engine 102 returns the rank for the query results based on the sample positions at the leaf nodes, and based on any alternate ranking that is imposed. This is indicated by block 606 in FIG. 8B.

The handling of a degenerate node can be accommodated in another way. For example, trainer 152 can train additional dependency structures for the nodes to reduce or eliminate degeneracy.

Figure 9A:
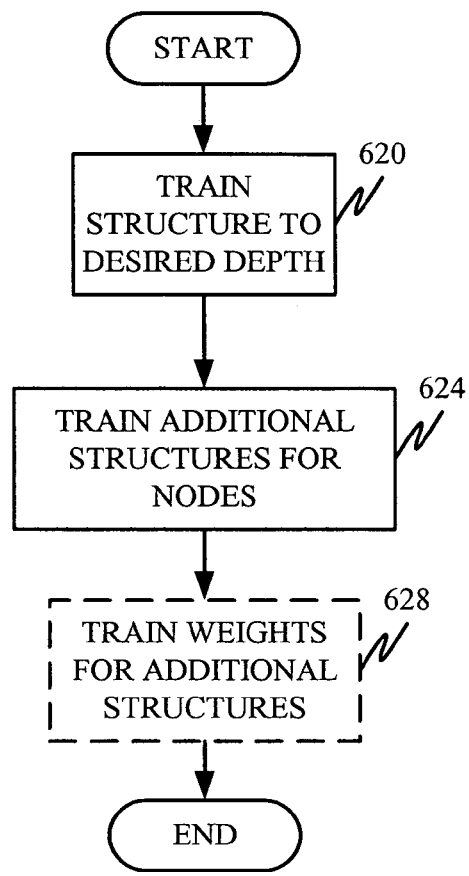
FIG. 9A is a flow diagram illustrating one illustrative embodiment of the operation of the system shown in FIG. 2 in training additional dependency structures to accommodate for degenerate nodes.

FIG. 9A is a flow diagram illustrating the operation of trainer 152 in accordance with one embodiment, in order to train additional structures. First, trainer 152 trains the overall dependency structure 200 to a desired depth (in the example being discussed, it is depth 3 as shown in FIG. 8A). This is indicated by block 620 in FIG. 9A.

Figure 9B:
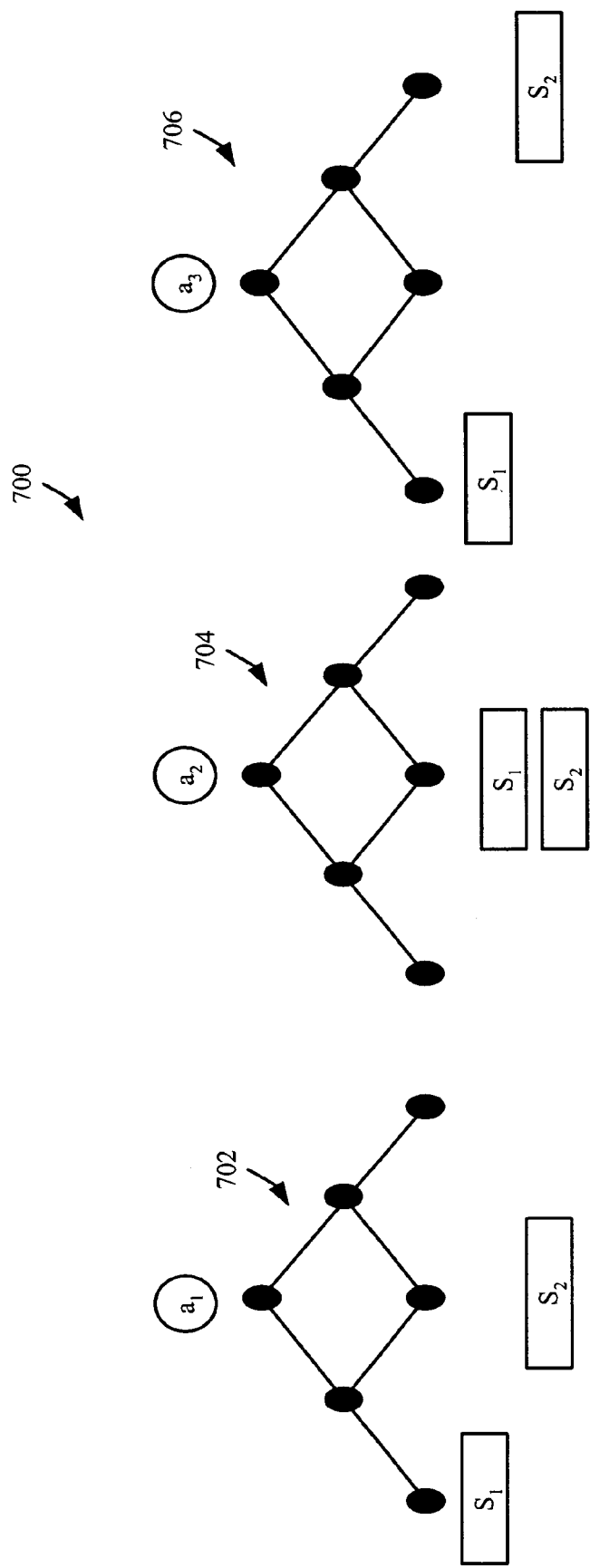
FIG. 9B illustrates a plurality of additional dependency structures used to rank vectors in degenerate nodes.

Trainer 152 then illustratively trains additional dependency structures for the nodes. This is indicated by block 624 in FIG. 9A. FIG. 9B shows a set of additional dependency structures 700 for node 210. The additional structures 700 include dependency structure 702, dependency structure 704, and dependency structure 706. They are trained in a similar way as dependency structure 200 discussed above.

If a set of samples is applied to all four dependency structures (structures 200, 702, 704 and 706) it will be very unlikely that all samples will end up at the same leaf nodes in all four dependency structures. Therefore, during runtime, where samples S1 and S2 for query 1 both ended up at the same leaf node 210 in data structure 200, samples S1 and S2 are then applied to the additional dependency structures 702, 704, and 706. It can be seen in the illustrative embodiment that sample S1 ended up at the first leaf node in dependency structure 702, at the second leaf node in dependency structure 704, and at the first leaf node in dependency structure 706. Assuming that the first leaf node is given a score of 3, the second leaf node is given a score of 2 and the third leaf node is given a score of 1, the cumulative score from the additional dependency structures 702-706, for sample S1, is 3+2+3=8.

It can also be seen from FIG. 9B that sample S2 ended up at leaf nodes 2, 2, and 1 in dependency structure 702-706, respectively. Therefore, its score is 2+2+1=5. Based on the scores received from the additional data structures 700, the result corresponding to sample S1 will be ranked ahead of the results corresponding to sample S2.

FIG. 9C illustrates the runtime operation of search engine 102 in using these additional dependency structures 700. Search engine 102 first runs the samples at the node through the additional structures 700. This is indicated by block 720 in FIG. 9C. Next, search engine 102 calculates the scores from the additional structures. This is indicated by block 722. Then, in FIG. 8B, processing continues at block 606 where the ranked search results are output by search engine 102 based on the scores.

In yet another embodiment, each of the additional dependency structures 700 is given a weight, and the score for the samples applied to those dependency structures 700 is the weighted score. The weights are shown in FIG. 9B as weight $\alpha_1$ for dependency structure 702, weight $\alpha_2$ for dependency structure 704, and weight $\alpha_3$ for dependency structure 706. Thus, the score for sample S1 in the dependency structure 700 will be $3(\alpha_1)+2(\alpha_2)+3(\alpha_3)$. Similarly, the score for sample S2 will be $2(\alpha_1)+2(\alpha_2)+\alpha_3$.

In one illustrative embodiment, the weights are chosen such that they are positive, and sum to one. Thus, the weighted scores for all three exemplary dependency structures 700 are given as follows:

$$\alpha_2[(\alpha_1)(s_1)+(1-\alpha_1)s_2]+(1-\alpha_2)s_3 \qquad \text{Eq. 2}$$

where $s_1$ is the score for dependency structure 702, $s_2$ is the score for dependency structure 704 and $s_3$ is the score for dependency structure 706. By following this weighting format, it can be seen that the weights will also be positive and sum to one. The particular weights, $\alpha_1$ through $\alpha_3$ can be selected in any known way, subject to the positivity and additivity constraints. In one example, a greedy search is deployed to obtain $\alpha_1-\alpha_3$.

Figure 10:
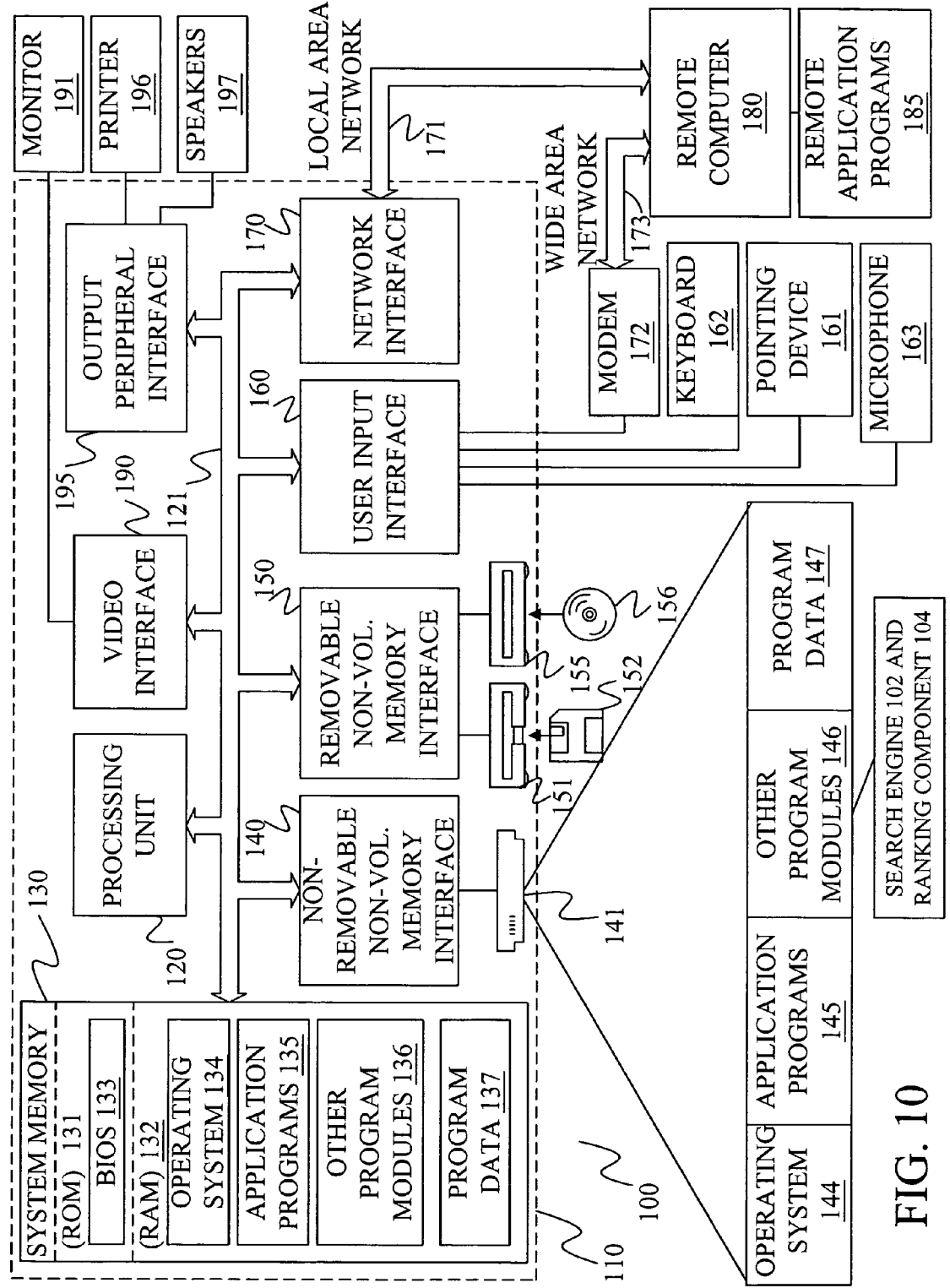
FIG. 10 shows one illustrative embodiment of a computing environment in which the system can be used.

FIG. 10 illustrates an example of a suitable computing system environment 100 on which embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 10, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 10 illustrates operating system 134, application programs 135, other program modules 136, and program data 137.

The computer 110 may also include other removable/non-removable volatile/nonvolatile computer storage media. By way of example only, FIG. 10 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 10, provide storage of computer readable instructions, data structures, program modules and other data for the computer 110. In FIG. 10, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. FIG. 10 shows search engine 102 and ranking component 104 as being part of other program modules 146. However, it will be understood that they could reside elsewhere as well, and even on remote computer 180.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 10 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 10 illustrates remote application programs 185 as residing on remote computer 180. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of training a ranking component to rank items using a computer with a processor, comprising:

generating, with the processor, a dependency structure having at least one parent node and at least two dependent nodes, dependent from the parent node, the dependency structure ranking items that pass through nodes in the dependency structure when the items are applied to the dependency structure with the processor, each parent node including decision criteria for deciding which dependent node to send an item to, as the item passes past the parent node, the rank of an item relative to other items being dependent on a position of a leaf node to which the item passes relative to a position of other leaf nodes to which the other items pass, each of the leaf nodes in the dependency structure representing a rank that is different from all other leaf nodes in the dependency structure, the rank indicating how closely each item corresponds to a user input relative to other items in a set of items; and training the dependency structure with the processor by iteratively performing operations to define the decision criteria at the nodes, the operations comprising at least one of data splitting and data merging on items of training data as the items of training data pass through the nodes, each of the operations being performed such that a ranking function that is indicative of a quality of a rank of the items of training data is optimized for each node, the optimization at each node including assuming a worst possible ranking for the items of training data sent through the node, calculating a minimum normalized discounted cumulative gain function based on the worst possible ranking, and finding a split that gives a maximum value of the minimum normalized discounted cumulative gain function.

2. The method of claim 1 wherein each of the items of training data include a feature vector of features, and wherein performing operations to define the decision criteria comprises:

selecting a feature and feature value, at a selected node, upon which to split or merge the items of training data at the selected node to identify a best data split or data merge at the selected node.

3. The method of claim 2 selecting a feature and feature value comprises:

identifying a best data split or data merge by determining which operation results in a largest increase in the ranking function.

4. The method of claim 2 wherein generating a dependency structure comprises:
generating a directed acyclic graph.

5. The method of claim 2 wherein generating a dependency structure comprises:
generating a tree structure.

6. The method of claim 1 wherein training the dependency structure comprises:
performing the operations such that a plurality of ranking functions are optimized.

7. The method of claim 1 and further comprising:
continuing to train the dependency structure until the ranking function increases by no more than a given threshold amount with each subsequent data splitting or data merging operation.

8. The method of claim 2 wherein each item of training data has a label indicative of a relationship between the item and a user input, and wherein training the dependency structure comprises:
assigning a force to each item of training data based on an increase in the ranking function obtained by swapping its position in the dependency structure with one or more other items of training data, the force influencing a direction with which the item of training data to which it is assigned passes through the dependency structure relative to other items of training data corresponding to the user input.

9. The method of claim 2 and further comprising:
training additional ranking mechanisms for selected nodes in the dependency structure.

10. The method of claim 9 wherein training additional ranking mechanisms comprises:
training additional dependency structures for the selected nodes.

11. A computer readable storage medium storing computer readable instructions which, when executed, cause a computer to train an information retrieval ranking component by performing a method comprising:
accessing, with a computer processor, a set of training data comprising a plurality of queries, each query having an associated set of search results, each set of search results including feature vectors having corresponding values;
dividing or merging, with the computer processor, the search results applied to a node in a dependency structure relative to dependent nodes that depend from the selected node, based on decision criteria at the node, the decision criteria at the node being based at least in part on a halfway point that is calculated utilizing at least a portion of the values of the feature vectors;
calculating, with the computer processor, a normalized, discounted, cumulative gain (NDCG) as a performance metric indicative of a result ranking performance after dividing or merging the search results at the node, the result ranking performance being indicative of how well the search results relate to the queries relative to other search results; and
for each of a plurality of nodes in the dependency structure, repeating, with the computer processor, the steps of dividing or merging the search results and calculating the NDCG, for different decision criteria, to directly increase the NDCG and to obtain leaf nodes in the dependency structure such that a rank of the search results, relative to one another, is determined by a position of the leaf nodes, relative to other leaf nodes in the dependency structure, at which the search results reside when the search results are applied to the dependency structure using the computer processor, the leaf nodes each representing a different rank such that a search result residing at one leaf node in the dependency structure has a rank, relative to other search results, that is different from search results residing at all other leaf nodes in the dependency structure, and wherein calculating the NDCG comprises calculating the NDCG assuming g one of a worst possible ranking of the feature vectors and a mean NDCG at each of the dependent nodes, based on the rank.

12. The computer readable medium of claim 11 and further comprising:
training additional dependency structures for selected leaf nodes in the dependency structure.

\* \* \* \* \*